G. C. VOLLMER.
MOTOR AND THE LIKE.
APPLICATION FILED MAR. 31, 1917.

1,263,821.

Patented Apr. 23, 1918.
4 SHEETS—SHEET 1.

Inventor
Gustav C. Vollmer
by Alfred Lewis
atty.

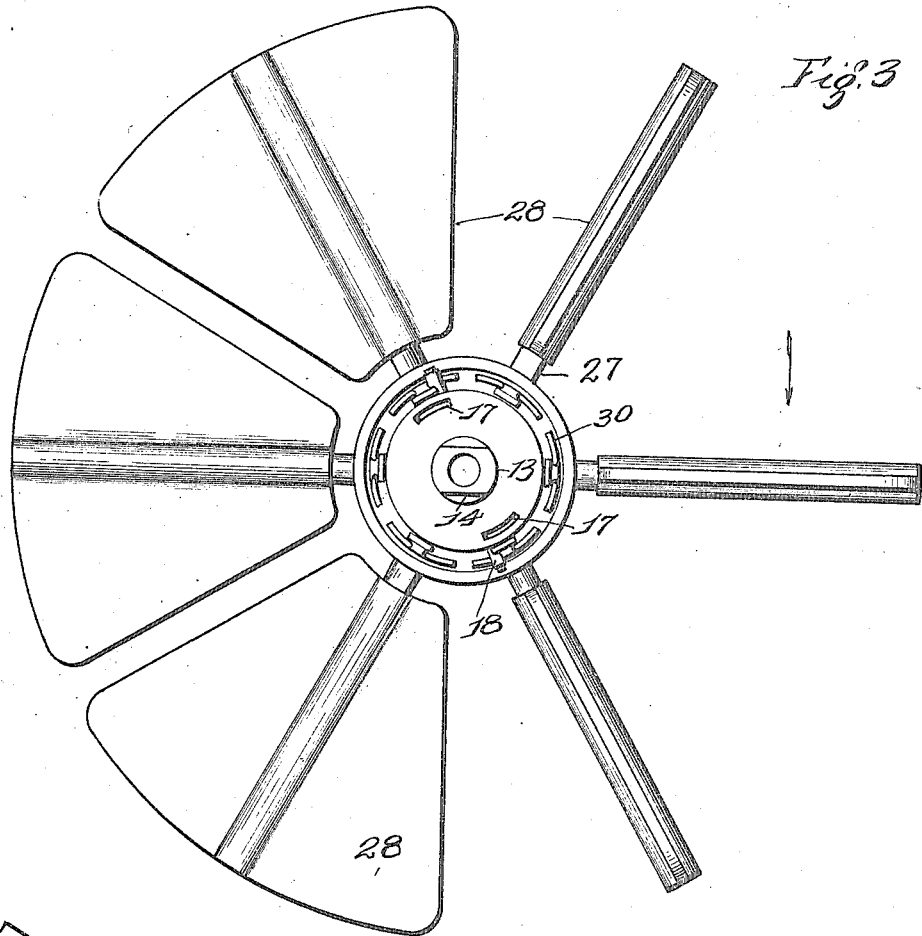
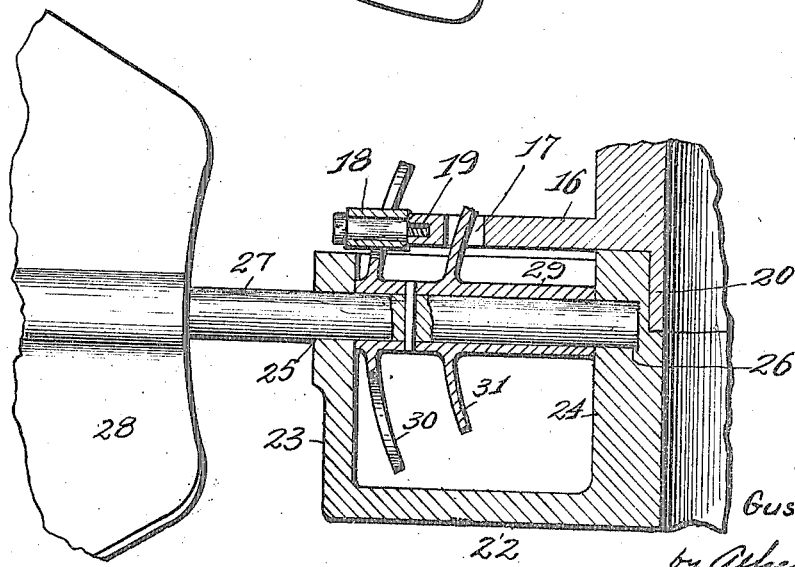

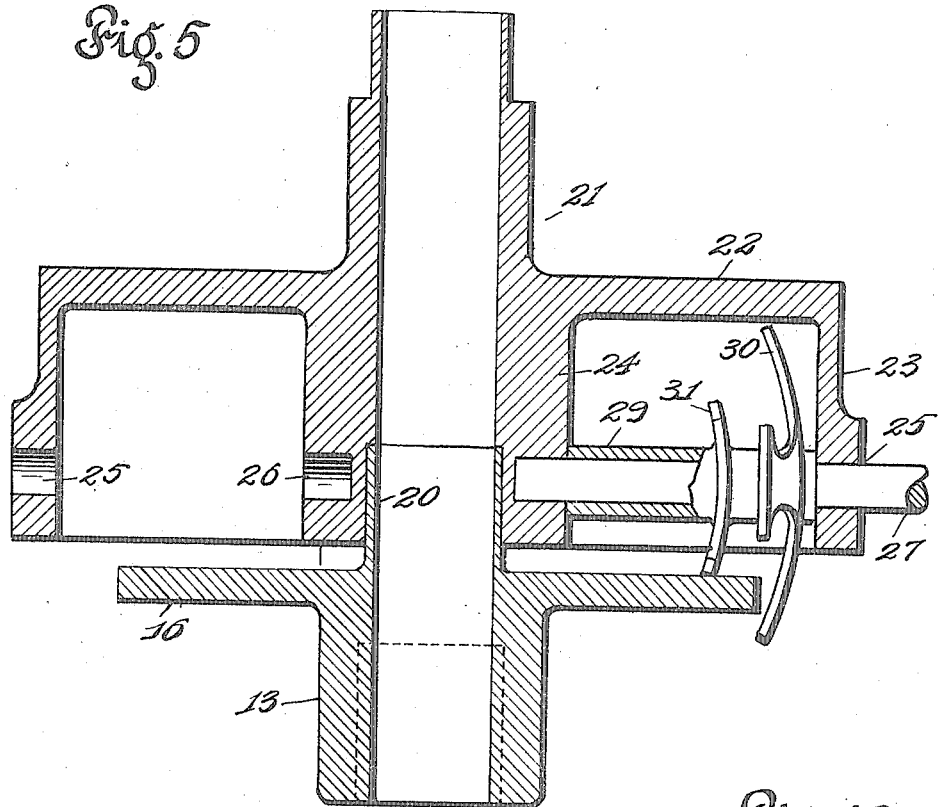
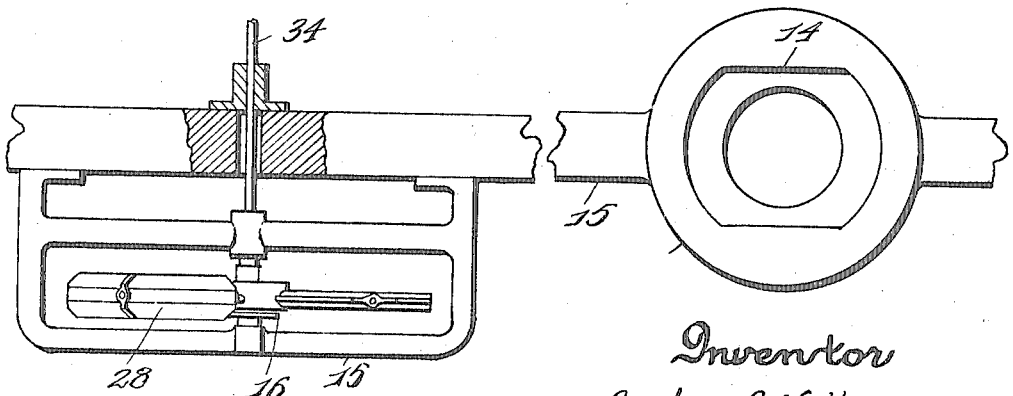

G. C. VOLLMER.
MOTOR AND THE LIKE.
APPLICATION FILED MAR. 31, 1917.
1,263,821.
Patented Apr. 23, 1918.
4 SHEETS—SHEET 4.
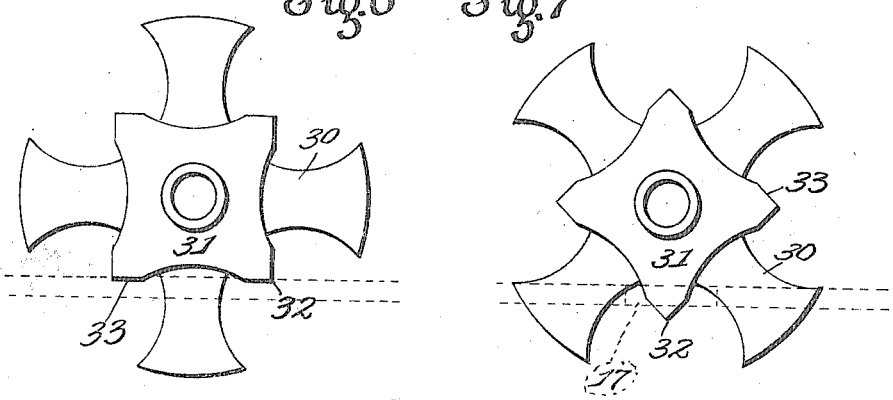
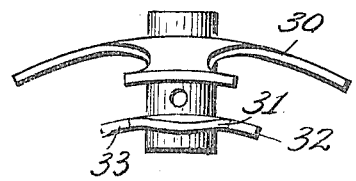
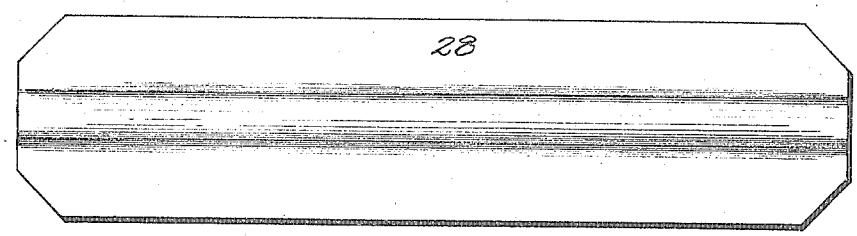
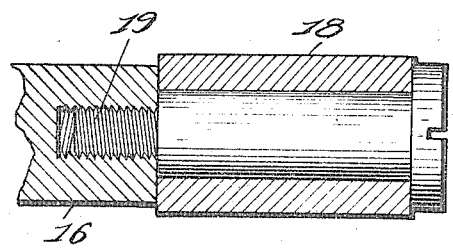
Inventor
Gustav C. Vollmer
by Alfred A. Eno
atty.

UNITED STATES PATENT OFFICE.

GUSTAV C. VOLLMER, OF ST. LOUIS, MISSOURI.

MOTOR AND THE LIKE.

1,263,821. Specification of Letters Patent. Patented Apr. 23, 1918.

Application filed March 31, 1917. Serial No. 158,787.

*To all whom it may concern:*

Be it known that I, GUSTAV C. VOLLMER, a citizen of the United States, and resident of St. Louis, Missouri, have invented certain new and useful Improvements in Motors and the like, of which the following is a specification.

This invention relates to improvements in motors and the like, and has for its object a rotor which is equipped with a plurality of vanes, the rotor being mounted on a shaft and the mechanism may be submerged in a stream so that the motor will be rotated by the current; or the mechanism may be elevated sufficiently and mounted on a high support so that the same may be operated by the air or in wind-mill fashion.

Another object of my invention is to construct a motor with a mechanism that will automatically during the rotation of the rotor change the angular position of the vanes so that while a certain number of the vanes are being in operated position the remainder cuts through the water or air in a feathering fashion. The mechanism for changing the position of the vanes being located beneath the rotor and automatically changing the vanes from a horizontal to a vertical position when the same reaches two particular points. The motor has been especially designed to be operated as a current motor which is placed in rotation by the mere current of a stream but the same may be also horizontally positioned in the air and operated by the wind as a wind-mill.

From the shaft connected to the rotor is directed the power and the connection thereto may be of any desirable form which may be found most practicable and efficient.

Fig. 3, is a bottom plan view.

Fig. 4, is an enlarged detail cross-sectional view of a portion of the rotor and vane showing the section construction.

Fig. 5, is a central vertical sectional view of my invention.

Fig. 6, is a detail front view of the star wheel and tripper plate showing the same in the position when holding the vane in rigid position during its travel.

Fig. 7, is a view of the same showing it in the act of turning the vane from one position to the other.

Fig. 8, is a detail top plan view of the star wheel and tripper plate.

Fig. 9, is a detail view of a long narrow paddle which might be used as a vane for shallow streams.

Fig. 10, is an enlarged detail sectional view of the roller and its support made use of for contacting with the star wheel for assisting the shifting of the vane.

Fig. 11, is a detail sectional view of a frame made use of in which the motor is mounted when using the same as a stream motor.

Fig. 12, is a detail bottom plan view of the bearing by which the supporting plate is held stationary.

Figure 1:
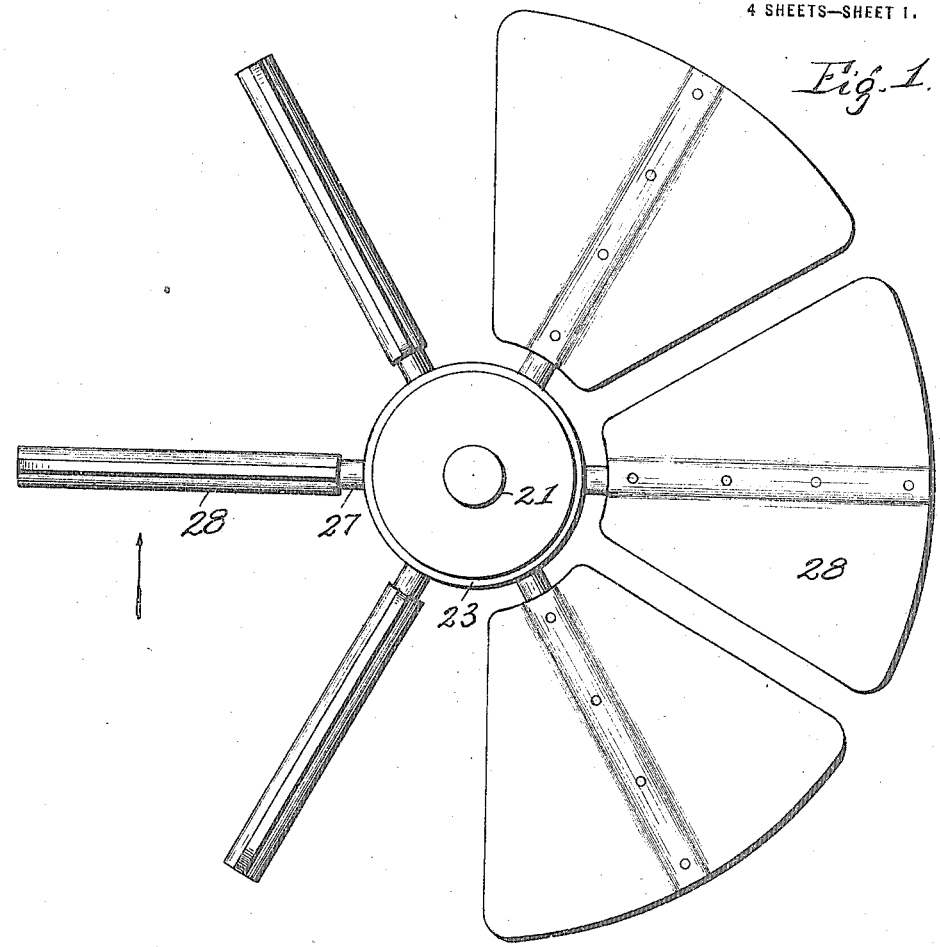
Figure 1, is a top plan view of my invention.
Figure 2:
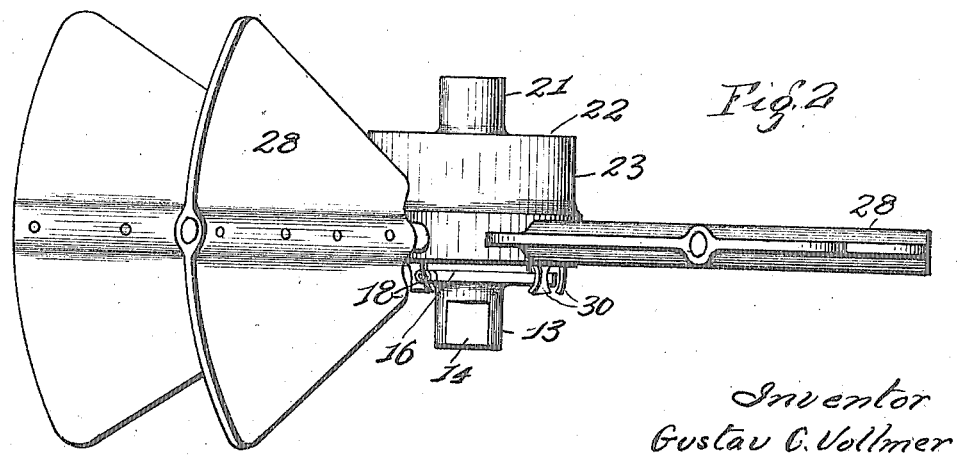
Fig. 2, is a side view of the same.

Referring to the construction of my invention 13 indicates a supporting plate its hub portion being flattened as that indicated by the numeral 14, and by which the hub may be supported in the frame 15 in order to hold the plate rigid. The upper portion of the plate is terminated into a circular disk 16 which is provided at two points with elongated slots 17, and projecting from the periphery of the disk and in proper relation to a position with the slots 17 are mounted rollers 18 supported on studs 19 seated in and affixed to the disk. The purpose of these rollers will be later described in connection with the operation. The supporting plate is provided with a central projecting sleeve 20 over which is mounted the rotor casing 21, this consists of a cylindrical body having a top 22, a rim 23 and a center hub 24. This rotor casing is so arranged as to fit on the supporting plate and yet be allowed to rotate horizontally.

The rim 23 is provided at equal intervals apart with bores 25 and the hub is likewise provided with bores 26, which are in direct alinement with the bores 25 and which act as a bearing support for the shafts 27 to which the wings 28 are fastened, which act as the vanes with which the current contacts.

On each of the shafts and between the rim and the hub is attached a sleeve 29 on which is mounted a star wheel 30 and a tripper plate 31. The general construction of these two parts are clearly illustrated in Figs. 6, 7, and 8. The star wheels are for the purpose of turning the shaft together with the vane when one of the arms of the star wheel is brought in contact with the roller 18 and when so in contact and by means of the semicircular recesses which form the star wheel into arms, considerable friction is averted and allows the wheel to be turned one-quarter around.

By means of the tripper plate the shaft together with the vanes are held rigid in its set position during the rotation of the rotor until one of the corners 32 comes over the slot 17 and while at this point one of the arms of the star wheel contacts with the roller, thereby automatically turning the vane from a vertical to a horizontal position or vice versa; and after the star wheel together with the tripper plate has passed over the slot the flattened surfaces 33 will ride on the flat surface of the disk 16 thus preventing any rotation or tilting movement of the vane until it has reached the slot and roller on the opposite side of the disk.

To illustrate the position of the motor when to be operated by the current of a stream, I show in Fig. 11 a frame with the motor in position and the rotor portion of the motor attached to the shaft 34 to which may be attached counter shafts, ears, or the like for placing other mechanism into operation.

It will be observed that by the structure as shown the motor will be very efficient as a stream motor for the reason that the wings or paddles are so arranged that but one-half of the number are in operative or vertical position the current striking the flat portion of these paddles driving the motor in the direction as indicated by the arrows shown in Figs. 1 and 3; the remaining one-half of the paddles are inoperative and are directed to the water edgewise so as to relieve friction thus acting as a feathering movement the same as when an oarsman feathers the oar on return movement.

When the motor is used for a wind-mill and in order to keep the position of the vertical paddles against the air current I then will be compelled to attach to the supporting plate a tail vane which is of course of ordinary construction and the same as that ordinarily used on present wind-mills.

Having fully described my invention what I claim is:

1. A motor of the class described comprising a stationary plate, a rotating member, a plurality of vanes carried by said rotating member and axially mounted thereon and a sleeve connected to the axle of each vane, and a star wheel and tripper plate for changing the position of one-half of the vanes from horizontal to vertical, substantially as specified.

2. A motor of the class described comprising a stationary disk-like member, a rotating member mounted thereon, a plurality of shafts supported by the rotating member, vanes connected to each shaft, a sleeve, a star wheel and a tripper plate carried on each sleeve whereby one-half number of the vanes are positioned from vertical to horizontal and the other half from horizontal to a vertical position, substantially as specified.

3. A motor comprising a rotor, vanes axially mounted thereon, a stationary member on which the rotor operates, and a sleeve located on each shaft supporting the vanes, a star wheel and tripper plate positioned on the sleeve for changing their position from horizontal to vertical at a given period and a means for holding the vane in its set position during the partial rotation, substantially as specified.

4. A motor comprising a rotatable mounted casing, vanes axially mounted thereon and radiating therefrom, one half of the set of vanes being arranged to a position for direct contact with the current, the other set arranged to cut through the current with very little friction, and a star wheel and tripper plate located in the casing for changing the position of each vane at a given period and for supporting the same in its set position for a certain period, substantially as specified.

5. A motor to be operated by water current or air comprising a rotating member and a stationary member, each closely connected, shafts supported in the rotating member, vanes attached to the projecting ends of said shaft, a sleeve mounted on each shaft, a star wheel and tripper plate for changing the position of each vane from horizontal to vertical and again from vertical to horizontal so that one-half of the set of vanes are operative while the other half set are inoperative, substantially as specified.

6. A motor of the class described comprising a stationary set disk-like member, a rotating member supported on the stationary member, a shaft mounted in the rotating member and placed in operation therewith, a plurality of horizontal shafts supported in bearing in the rotating member, sleeves mounted thereon, a tripper plate mounted on the sleeve and in position to slide upon a disk-like member, a star wheel mounted on the sleeve and adapted to operate freely from the disk-like member, a pair of projecting rollers mounted on the periphery of the disk-like member to be contacted with by the arms of the star wheel for partially rotating the same together with the sleeve and shaft on which it is mounted, said rollers being positioned at a place in alinement with slits formed in the disk-like member to which the corners of the tripping plate will project for permitting partially rotating to the shaft, and a vane carried by each of the shafts, substantially as specified.

In testimony whereof, I have signed my name to this specification, in presence of two subscribing witnesses.

GUSTAV C. VOLLMER.

Witnesses:
ALFRED A. EICKS,
WALTER C. STEIN.

Copies of this patent may be obtained for five cents each, by addressing the "Commissioner of Patents, Washington, D. C."